United States Patent [19]

Vallee

[11] Patent Number: 4,498,398
[45] Date of Patent: Feb. 12, 1985

[54] DISPLAY TURNTABLE

[75] Inventor: Robert G. Vallee, Grosse Pointe Woods, Mich.

[73] Assignee: George P. Johnson Co., Warren, Mich.

[21] Appl. No.: 166,320

[22] Filed: Jul. 7, 1980

[51] Int. Cl.³ ............................................. B60S 13/02
[52] U.S. Cl. ...................................... 104/44; 104/45; 104/46; 403/381
[58] Field of Search ........................ 104/44, 35, 45, 46; 403/381, 353

[56] References Cited

U.S. PATENT DOCUMENTS

| | | | |
|---|---|---|---|
| 1,562,853 | 11/1925 | Schonberger | 104/45 |
| 3,338,176 | 8/1967 | Petersen | 104/35 |
| 3,566,798 | 3/1971 | Peitzman | 104/46 |
| 4,019,298 | 4/1977 | Johnson | 403/381 |

Primary Examiner—Richard A. Bertsch
Attorney, Agent, or Firm—Barnes, Kisselle, Raisch, Choate, Whittemore & Hulbert

[57] ABSTRACT

A rotatable table for the display of large objects such as automotive vehicles and the like which is composed of a minimum number of components easily handled by individual assemblers. The components can be assembled and disassembled in a very short period of time and are easily transportable to different locations. The main components consist of a power turntable having stanchion recesses and truss outriggers removably carried by the central power turntable and radially disposed to support sector portions of a supporting top.

2 Claims, 12 Drawing Figures

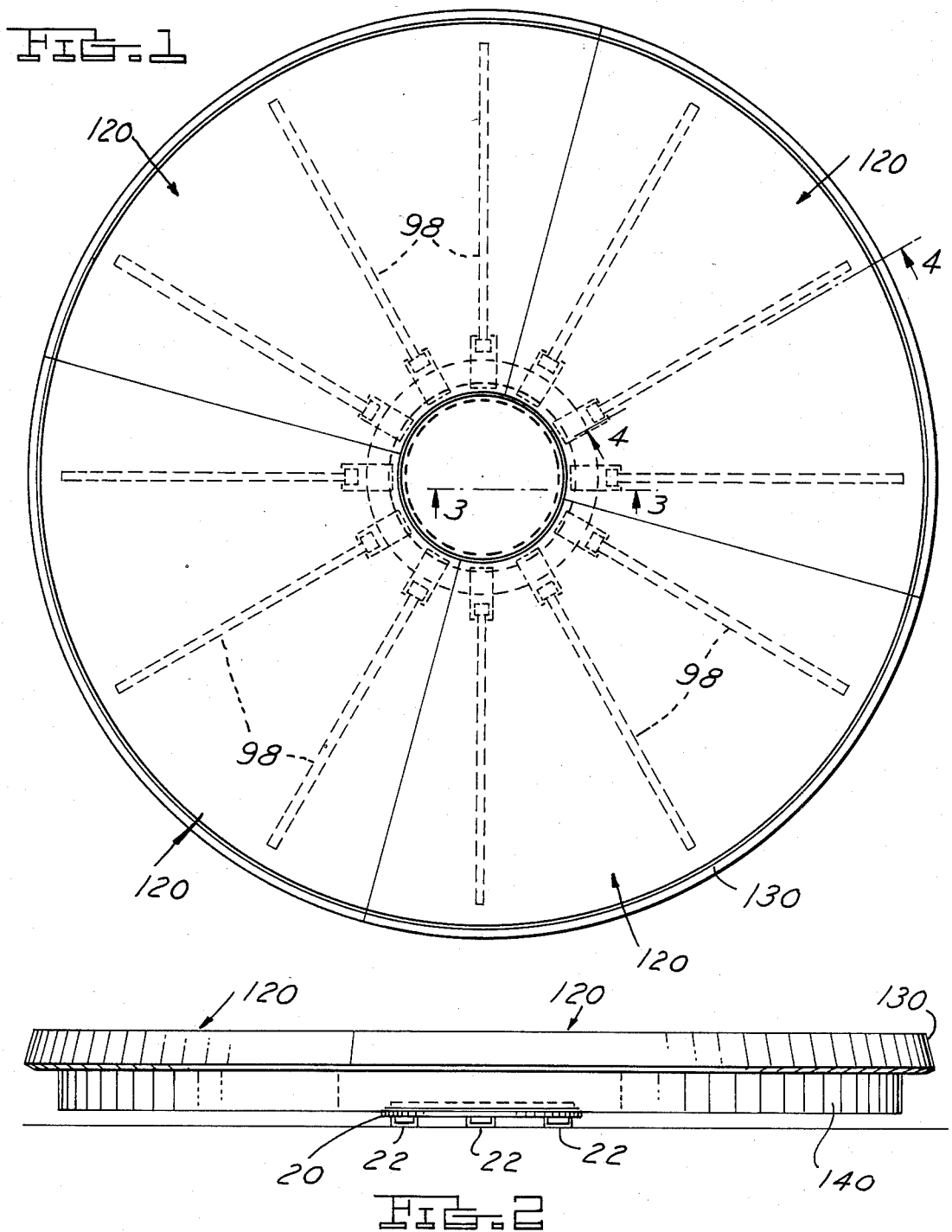

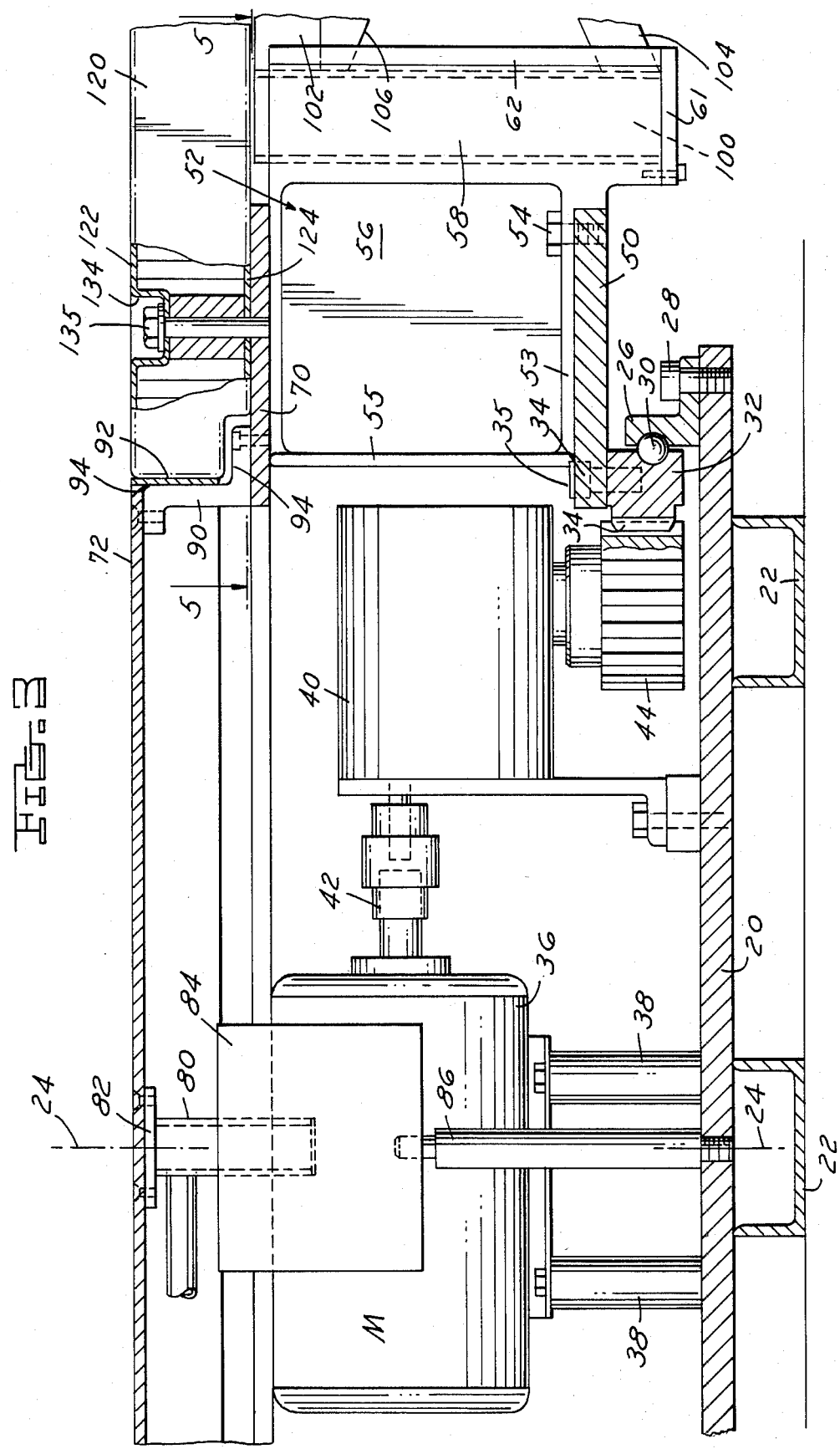

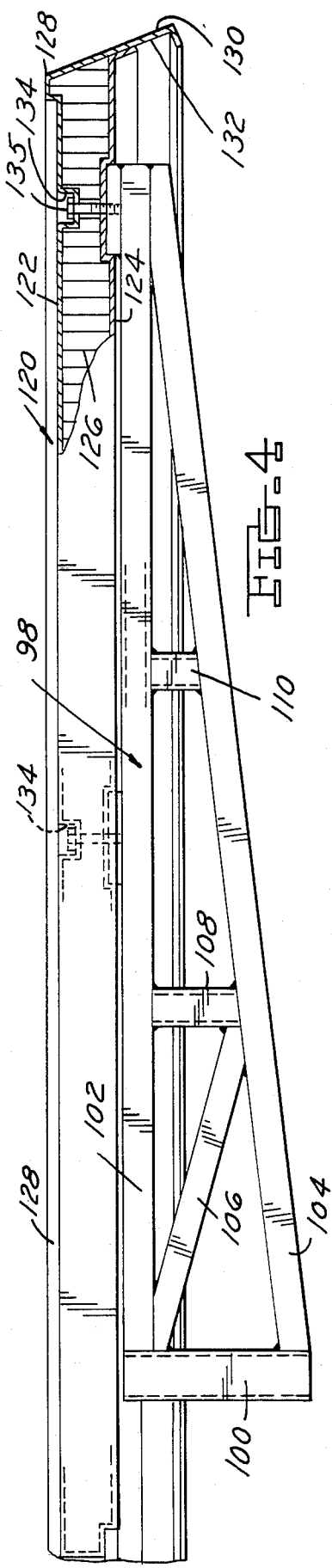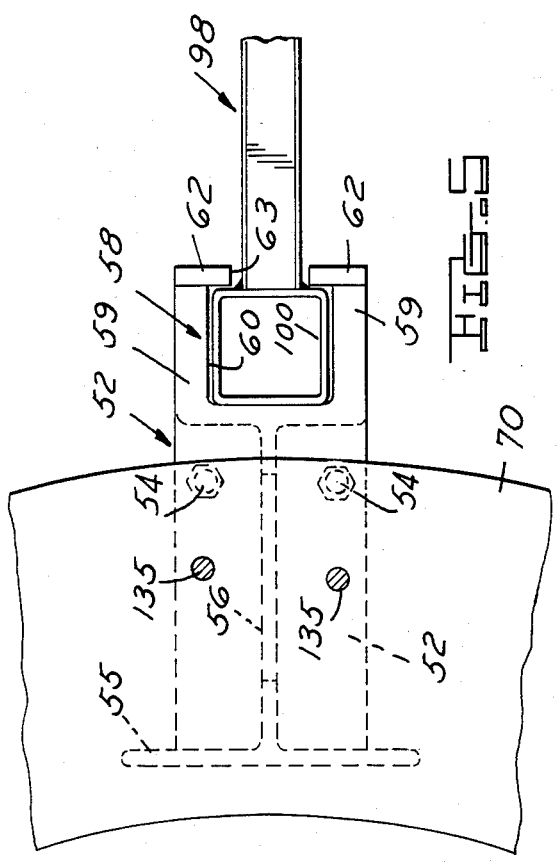

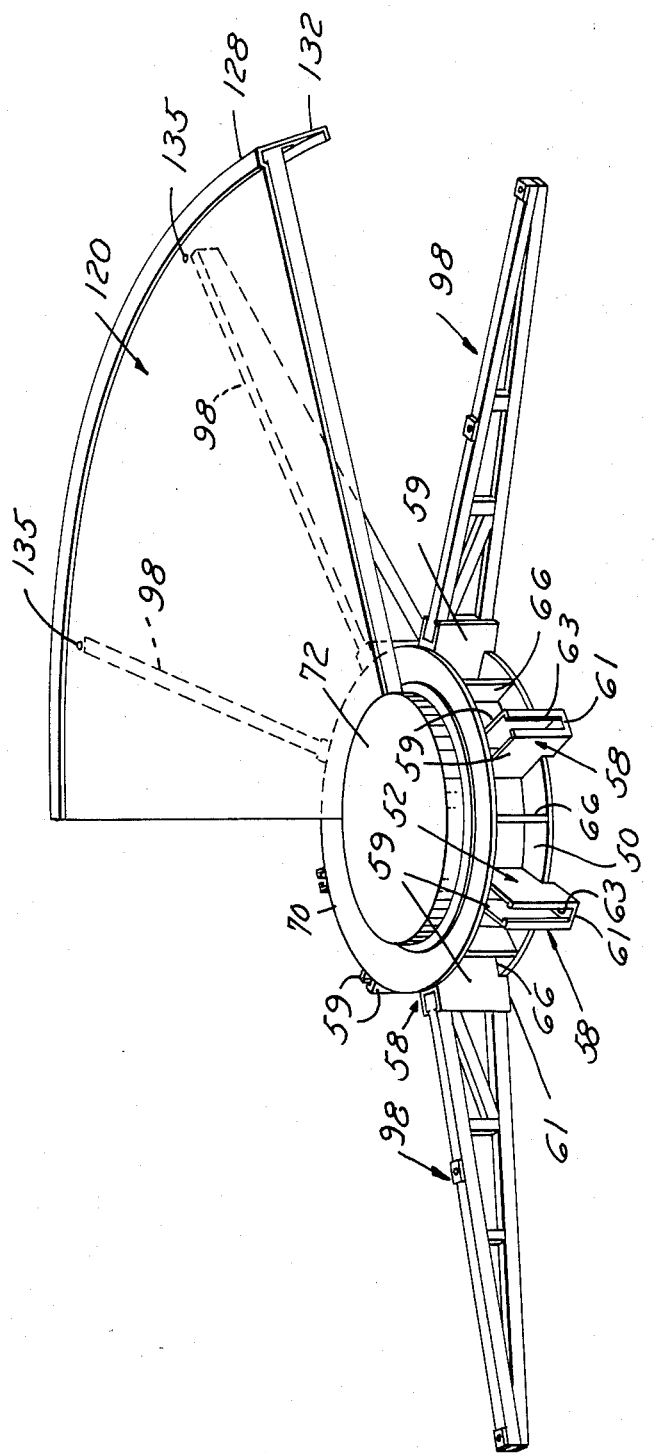

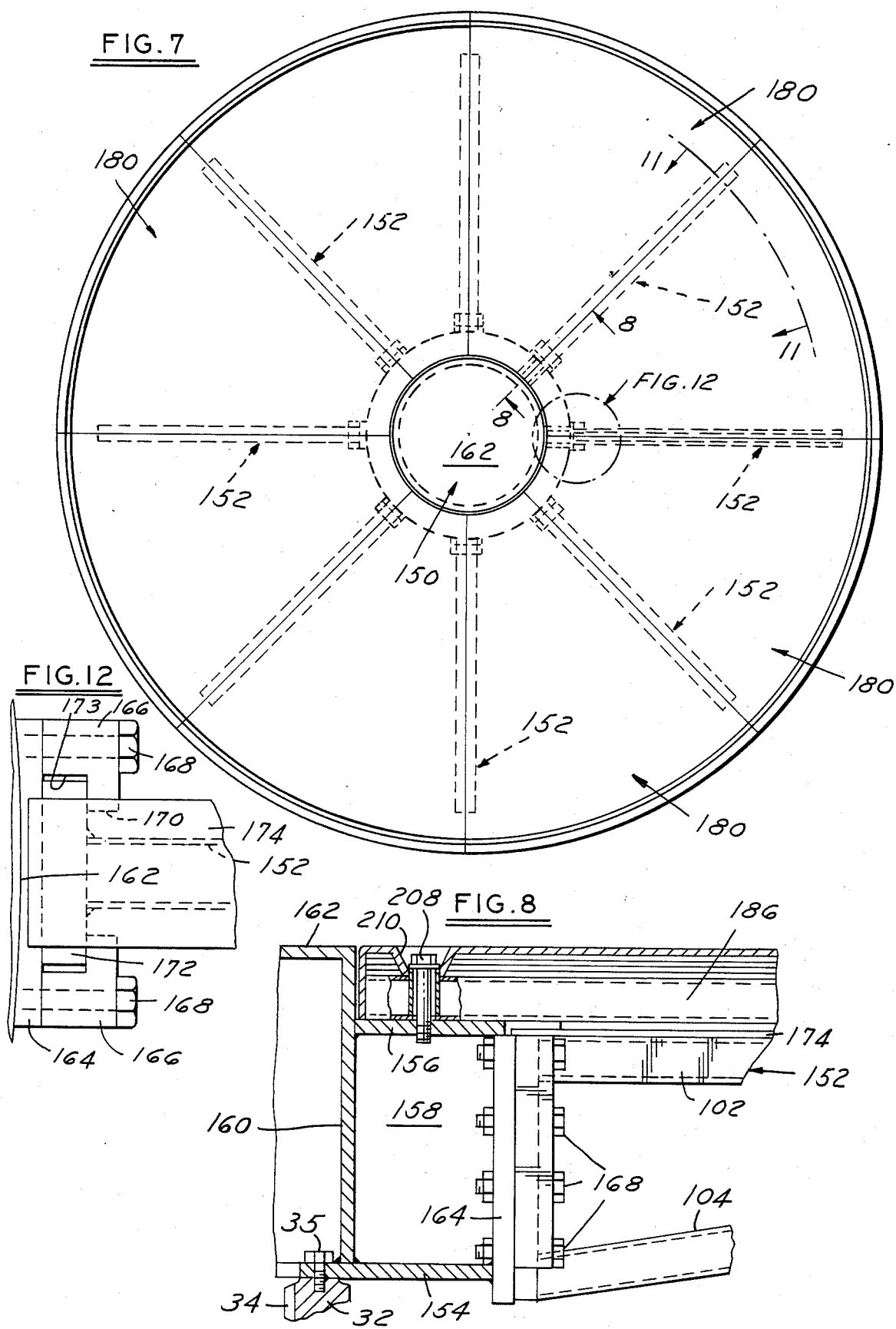

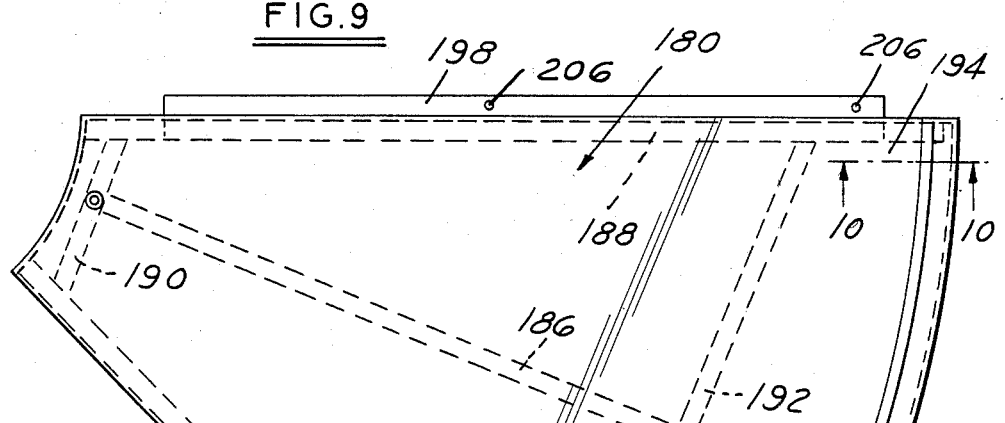
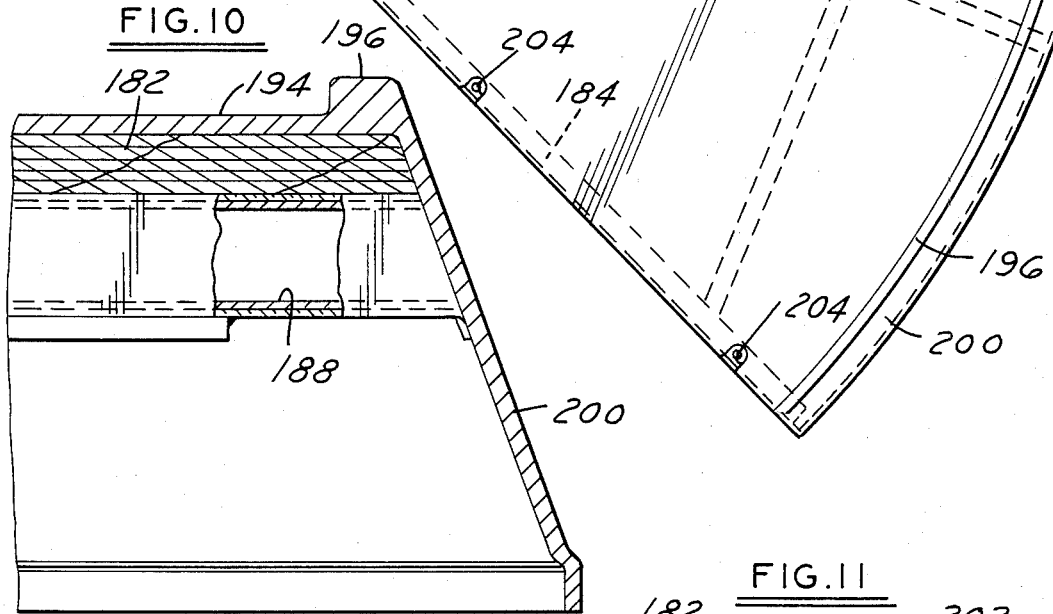
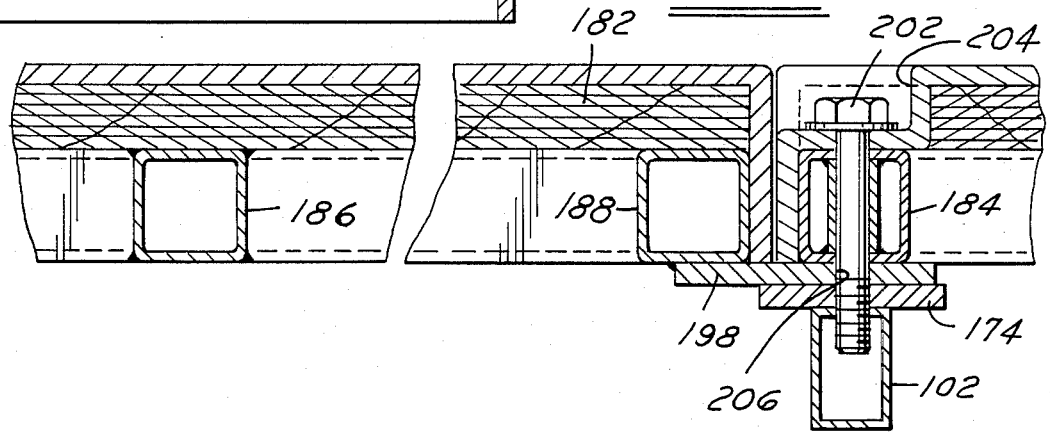

DISPLAY TURNTABLE

FIELD OF INVENTION

Demountable turntable display devices which can be dismantled into easily handled components and easily assembled. Use for conventions and trade shows for display of heavy articles such as automobiles.

BACKGROUND OF THE INVENTION

Product sales promotion quite often requires the dramatic display of the product, such as automobiles, in airports, hotels, display windows, convention headquarters, trade shows and the like. These products are frequently displayed on a turntable which is powered to turn at a slow rate so that passing public can get a variety of views from different angles. A rotating display also attracts more attention that a static display.

Usually, however, these displays are utilized for only a few days or a week and then they are moved to a different location. With a large turntable 10' to 15' in diameter, the transporting from one location to another presents difficulties. Trucks large enough to carry the device intact cannot enter the usual display areas because of load restrictions. In addition, the loading of such a device onto a truck requires either mechanical hoists or a large number of men.

The present invention is directed to the design of a rotary turntable of large scale design, 10' to 15', for holding automobiles and the like, which is made of relatively light components, and readily assembled or dismantled by not more than two men. The components can be easily carried in a relatively light commercial vehicle to any display area and reassembled without the need of mechanical hoists and using only simple hand tools.

The components, though relatively light, when assembled, are capable of carrying heavy loads. As an example, a 14' diameter turntable can have a carrying capacity of 6,000 pounds while the total weight is less than 1,800 pounds. The device is particularly adapted to power rotation and also can be adapted easily to provide a power source for lighting of the product if this is desired.

Other objects and features of the invention will be apparent in the following description and claims in which the invention is described together with the manner and process of using it in a detailed description directed to persons skilled in the art, all in connection with the best mode presently contemplated for the practice of the invention.

BRIEF DESCRIPTION OF THE DRAWINGS:

DRAWINGS accompany the disclosure and the various views thereof may be briefly described as:

FIG. 1, a top plan view of the turntable in assembled condition.

FIG. 2, a side view of the assembly.

FIG. 3, an enlarged sectional view on line 3—3 of FIG. 1.

FIG. 4, a sectional view on line 4—4 of FIG. 1.

FIG. 5, a segmental view on line 5—5 of FIG. 3.

FIG. 6, a perspective view illustrating some of the details of the assembly.

FIG. 7, a plan view of a modified structure.

FIG. 8, a sectional view on line 8—8 of FIG. 7.

FIG. 9, a plan view of a sector of the modified structure of FIG. 7.

FIG. 10, a sectional view on line 10—10 of FIG. 9.

FIG. 11, a sectional view on line 11—11 of FIG. 7.

FIG. 12, a top view of a stanchion socket at circle 12 of FIG. 7 with platform sector removed.

DETAILED DESCRIPTION OF THE INVENTION

With reference to the drawings, in FIG. 3, a circular base plate 20 is supported on suitable U-shaped structural members 22, the centerline of the rotating device being shown at 24. A circular flange, L-shaped in cross-section, is shown at 26 with the base of the flange being bolted to support plate 20 by bolts 28.

A bearing race inside of flange 26 carries bearing balls 30 which operate in conjunction with a circular drive gear 32 having internal gear teeth 34 and a ball bearing race on the outer circumference to cooperate with the balls 30. A motor 36 supported on posts 38 on base plate 20 drives a gear reducer 40 through a drive coupling connection 42, the gear reducer having an output gear 44 which meshes with the teeth of ring gear 34 on the internal circumference of the ring 32.

A horizontal ring plate 50 is mounted at its inner circumference on the ring gear 32 by bolts 35 and disposed around this ring plate 50 are radially extending structural I-beam type members 52 bolted to the ring 50 at 54 and having an inner back plate 55 and a strengthening web 56 (see FIG. 5) which, in conjuction with the base plate 53, supports a vertical channel forming a stanchion 58 having a vertical well socket 60 closed at the bottom by plate 61 and partly closed at the outer edges by plates 62 to form a reentrant slot 63. Spaced structural elements 59 of stanchion 58 are shown in FIG. 6 and additional reinforcement plates 66 may be provided between the ring 50 and a top ring 70 to be described as shown in FIG. 5.

Above the structural element 52 is a top ring plate 70 supported on the structural units 52 and any intermediate reinforcing plates, such as 66, that are circumferentially disposed between the two plates 50 and 70. A central cover cap 72 is disposed over the central portion of the assembly to enclose the motor and gear reducer.

A bushing hanger 80, FIG. 3, is supported by a flange 82 on the cover 72, this being associated with a multiple station collector ring 84 supported by a stop pin post 86 from bottom plate 20. This portion of the assembly can be used for the furnishing of power from a stationary floor source to the unit. The cover can be supported by a plurality of bracket elements 90 supported on the top ring 70. A closure skirt 92 with a flanged bottom rim 94 surrounds the brackets 90; this skirt can be welded to cover 72 at 94. The bottom rim 94 rests on plate 70 outside brackets 90.

As illustrated in FIGS. 1, 4 and 5, a plurality of outrigger trusses 98, triangular in profile, are provided to extend radially from the central support or load bearing unit. These truss units, twelve in number in the disclosed embodiments of FIG. 1, are formed with a tubular base unit 100 which has a sliding fit with the well socket 60 of stanchion 58 and seats at the bottom on plate 61. A horizontal strut 102 extends outwardly from base unit 100 and the triange is closed by an angled strut 104. Reinforcement bars 106, 108 and 110 complete the truss. Thus, as illustrated in FIGS. 1 and 5, the truss units extend radially outward from the central load bearing unit. These truss units are assembled simply by dropping the base tube 100 into the well socket 60.

The assembly is completed by sector shaped top members 120 formed on modules preferably of a plastic construction to reduce the weight. As shown best in FIG. 4, in between a top skin 122 and a bottom skin 124 is a honeycomb filler element 126 which with vertical cells provides a high strength filler. An outer peripheral ridge 128 is formed on the sectors with an angled edge sheet 130 which depends to form a skirt 132. Bolt wells 134 are formed into the top sheets 122 to receive hexagonal bolts 135 which secure the sector units to the outrigger trusses 98 and centrally to said top plate 70. The inner periphery of each sector is stepped to accommodate the flange 94 as shown in FIG. 3. In the disclosed embodiment, four sectors are used to complete the top and each one overlies three outrigger trusses.

The sectors may be made of other materials and constructions, but the object is to keep them relatively light so they can be handled by two men assemblers while having strength to support a 6,000 pound vehicle. An additional drop skirt 140, FIG. 2, can be used if desired.

Thus, it will be seen that with central support and load bearing unit, the outrigger trusses, and the sector top elements, very few parts are needed to form a complete power driven table which can be assembled and disassembled by two workers in a very short time. Accordingly, the unit can be moved from place to place as desired and set up for any prescribed period of time.

A modified structure utilizing the same basic principles is illustrated in FIGS. 7 and 11. In FIG. 7, a basic center hub structure 150 is shown with eight assembled outriggers 152. The supporting vertical sockets for the proximal end of the outriggers is shown in FIGS. 8 and 12. Between rings 154 and 156 are vertical plates 158 forming a circular structural weldment support with inner wall 160. A top plate 162 completes the inner basic hub structure or support. On circumferentially spaced outer plates 164 are mounted L-shaped brackets 166 bolted securely in spaced relation to plate 164 by bolts 168 to form a reentrant slot 170 (FIG. 12).

The outriggers 152 have a plate 172 between the top and bottom members 102, 104 which fits into the vertical socket 173 formed by plate 164 and member 166. A top plate 174 extending along the top elements 102 of the outriggers is wider than the elements 102 and rests on the top of members 164 and 166 to limit the movement of the plate 172 into the socket 173.

Turning now to the top sectors of the modified form shown in FIGS. 9, 10 and 11, an individual sector 180 is shown in FIG. 9. A sectional view in FIGS. 10 and 11 shows the construction of the sectors to be a plate of plywood 182 (¾" has proved satisfactory) with square steel tubes (1½"×1½"×1/6" has been utilized) forming a supporting framework made up of radial tubes 184, 186, 188 bridged centrally by a short tube 190 and outwardly of the center by tube 192. These tubes and the plywood are encased in fiber glass plastic which forms a cover sheet 194 with a built-up circumferential ridge 196 and the tubes are "glassed in" so they are secured to the entire structure. Each sector 180 has a flange 198 at one side and an integral skirt 200 depending at an angle to finish the units.

A sectional view of FIG. 11 shows the joint between two sectors. The side extending plate 198 overlies the outrigger plate 174. The unflanged side of an adjacent sector rests on the plate 174 and the sectors are bolted to the plate 174 by bolts 202, the heads of which are countersunk in pockets 204 formed in the top of the sectors. The bolts pass through holes 206 in flange 198. A bolt 208 in well 210, FIG. 8, secures the inner portion of the segment to ring 156.

Thus, in this embodiment of FIGS. 7 to 11, the edges of each sector overlie an outrigger and eight sectors are used for a structure with eight outriggers. These sectors are smaller and thus easier to handle. The inerlock of the radial edges of the sectors insures a solid unified table which is still easily assembled and disassembled.

What is claimed as new is as follows:

1. A rotating table for display of large heavy products such as vehicles and formed of manually manageable components which are readily assembled and disassembled which comprises:
   (a) a central portable stationary horizontal base member,
   (b) a rotatable center load bearing unit rotatably mounted on said base member,
   (c) radial stanchions circumferentially spaced around and permanently supported on said load bearing unit each having a vertical socket well with an open top,
   (d) a plurality of independent outrigger trusses each having a vertical drop-in base bar at the proximal end to insert vertically and fit removably in a socket well, and structural members extending radially outward of said base bar a predetermined distance from said base member, and
   (e) a plurality of portable shaped platform elements supported on and secured to said outrigger trusses to form a circular load bearing rotating table supported on said base member,
   (f) said shaped platform elements being sector shaped and being formed of a plywood plate, a framework of metal tubes underlying the radial edges of said plate, and a rigid plastic coating of material over side plate and around said tubes to unify the construction.

2. A rotating table for display of heavy products such as vehicles formed of manually manageable components which are readily assembled and disassembled which comprises:
   (a) a central stationary horizontal base member having a first circular bearing race,
   (b) a rotatable center load bearing unit having a second circular bearing race complemental to said first bearing race and operatively associated therewith,
   (c) a circular ring gear on said load bearing unit,
   (d) a power drive said base member having a drive gear to mesh with said ring gear,
   (e) a cover plate on said load bearing unit overlying said power drive,
   (f) radial stanchions circumferentially spaced and supported on said load bearing unit, each having a vertical socket well,
   (g) a plurality of outrigger trusses each having a vertical base bar at the proximal end to fit removably in a socket well, and structural members extending radially outward of said load bearing unit a predetermined distance, and
   (h) a plurality of sector shaped platform elements supported on and secured to said outrigger trusses to form a circular load bearing platform, said radial stanchions comprising top, bottom and back plates joined by a reinforcing web and a channel joined to said top plate, said bottom plate and said reinforcing plate forming a vertical recess, and plate means closing said recess at the bottom, said recess in said channel having a reentrant slot to accommodate said base bar and said radial structural elements.

* * * * *